United States Patent
Agrawal et al.

(10) Patent No.: US 11,871,207 B1
(45) Date of Patent: Jan. 9, 2024

(54) ACOUSTIC EDITING

(71) Applicant: INTERNATIONAL BUSINESS MACHINES CORPORATION, Armonk, NY (US)

(72) Inventors: Tushar Agrawal, West Fargo, ND (US); Christian Compton, Austin, TX (US); Jeremy R. Fox, Georgetown, TX (US); Sarbajit K. Rakshit, Kolkata (IN); Clement Decrop, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/930,075

(22) Filed: Sep. 7, 2022

(51) Int. Cl.
*H04S 7/00* (2006.01)
*G10K 11/178* (2006.01)

(52) U.S. Cl.
CPC ........ *H04S 7/302* (2013.01); *G10K 11/17861* (2018.01); *H04S 2400/11* (2013.01)

(58) Field of Classification Search
CPC ................ H04S 7/302; H04S 2400/11; G10K 11/17861
USPC .......................................................... 381/17
See application file for complete search history.

(56) References Cited

U.S. PATENT DOCUMENTS

| 8,831,255 | B2 | 9/2014 | Crawford |
| 9,310,959 | B2 | 4/2016 | Serletic, II |
| 2002/0103553 | A1 | 8/2002 | Phillips |
| 2005/0008167 | A1 | 1/2005 | Gleissner |
| 2009/0114079 | A1 | 5/2009 | Egan |
| 2009/0320671 | A1 | 12/2009 | Meeks |
| 2018/0024630 | A1 | 1/2018 | Goossens |
| 2018/0288558 | A1 | 10/2018 | Umminger, III |
| 2020/0042284 | A1* | 2/2020 | Milne ................ G06F 3/04883 |

FOREIGN PATENT DOCUMENTS

| CN | 208074913 U | 11/2018 |
| EP | 0124197 B1 | 11/1984 |
| WO | 2017205637 A1 | 11/2017 |

OTHER PUBLICATIONS

Adobe, "Project SonicScape: A Better Way to Edit Immersive Content," Oct. 18, 2017, [Accessed Apr. 11, 2022], https://www.youtube.com/watch?v=grR9DutbMO4, pp. 1-2.

(Continued)

*Primary Examiner* — Paul Kim
(74) *Attorney, Agent, or Firm* — Tihon Poltavets

(57) ABSTRACT

A method for acoustic damping of sound clips includes identifying an audio clip for a location of a user in an environment and fragmenting the audio clip into a plurality of sound clips. The method further includes, responsive to determining at least one sound clip from the audio clip requires acoustic damping, performing the acoustic damping on the at least one sound clip, where a damping ratio for the at least one sound clip is altered. The method further includes responsive to determining to stitch the plurality of sound clips, stitching the plurality of sounds clips to form the audio clip, where the plurality of sound clips includes the at least one sound clip with the acoustic damping. The method further includes displaying a visual representation of the audio clip with the plurality of sound clips.

12 Claims, 5 Drawing Sheets

(56) References Cited

OTHER PUBLICATIONS

Das et al., "No Pain, No Sustain: An Infinite Sustain Effects Pedal," [Accessed Apr. 10, 2022], https://ccrma.stanford.edu/~orchi/220C/orchi_das_project_report.pdf, pp. 1-5.

Dinsmore, "How to create interactive spatial audio in your 360 videos," Nov. 9, 2017, [Accessed Apr. 11, 2022], https://blog.eevo.com/how-to-create-interactive-spatial-audio-in-your-360-videos-8bdb1ffa727a, pp. 1-6.

IBM Watson Media, "Watson Media Live Streaming and Video Hosting Solutions", https://www.ibm.com/watson/media, accessed Apr. 25, 2022, pp. 1-8.

IBM, "Augmented and Virtual Reality Research at IBM Watson", https://researcher.watson.ibm.com/researcher/view_group.php?id=8071, IBM Augmented Remote Assist (2020), accessed Apr. 25, 2022, pp. 1-8.

Karlinsky, "Computer Vision and Augmented Reality", https://research.ibm.com/haifa/dept/imt/cvar/index.html, IBM Research, accessed Apr. 25, 2022, pp. 1-14.

Markets and markets.com, "Augmented Reality Market Size Global Forecast to 2026", https://www.marketsandmarkets.com/Market-Reports/augmented-reality . . . , Aug. 2021, pp. 1-12.

\* cited by examiner

ACOUSTIC EDITING

BACKGROUND

This disclosure relates generally to acoustic editing, and in particular to acoustic editing in augmented or virtual reality environments. Augmented reality (AR) is the integration of digital information, such as audio, with a physical environment in which a user is located. Virtual reality (VR) is a simulation of a three-dimensional digital environment in which a user can experience and interact with various digital objects within the three-dimensional digital environment. Both AR and VR require the utilization of an electronic device to present the digital information and the three-dimensional digital environment to the user. Audio in an AR or VR setting typically includes multiple audio clips stitched together to create an aggregated and complete audio track for a position of the user relative to the physical or digital environment. Due to the acoustical nature of three-dimensional spaces, there can be objects or materials within the three-dimensional spaces that reflect and absorb audio from various locations relative to a position of the user in the AR or VR environments.

SUMMARY

Embodiments in accordance with the present invention disclose a method, computer program product and computer system for acoustic damping of sound clips, the method, computer program product and computer system can identify an audio clip for a location of a user in an environment. The method, computer program product and computer system can fragment the audio clip into a plurality of sound clips. The method, computer program product and computer system can, responsive to determining at least one sound clip from the audio clip requires acoustic damping, perform the acoustic damping on the at least one sound clip, wherein a damping ratio for the at least one sound clip is altered. The method, computer program product and computer system can, responsive to determining to stitch the plurality of sound clips, stitch the plurality of sounds clips to form the audio clip, wherein the plurality of sound clips includes the at least one sound clip with the acoustic damping. The method, computer program product and computer system can display a visual representation of the audio clip with the plurality of sound clips.

DETAILED DESCRIPTION

Figure 1:
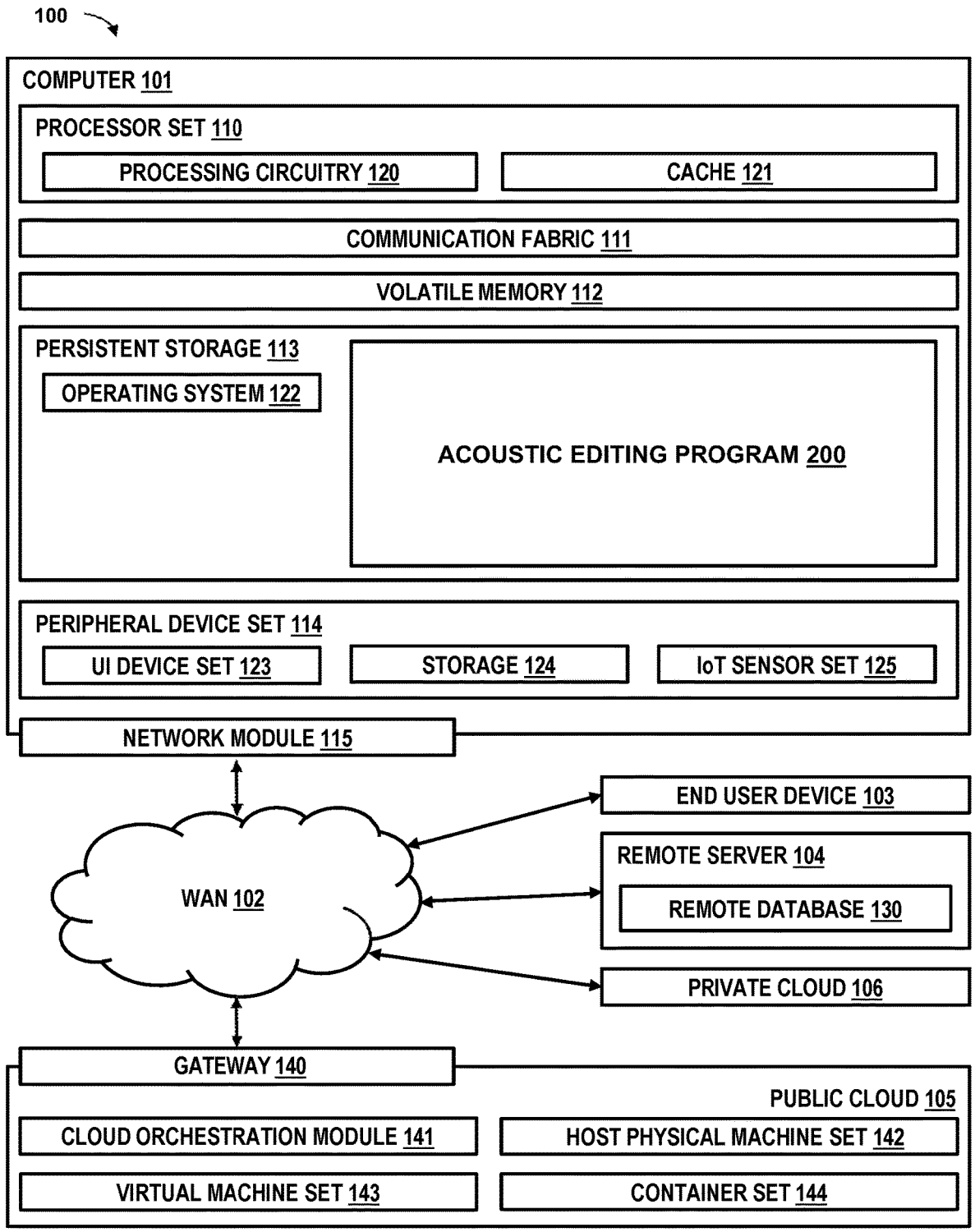
FIG. 1 is a functional block diagram illustrating a computing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide an acoustic editing program to identify sound clips within an audio clip in an augmented or virtual reality environment with an abrupt ending that include limited or no damping and create an appropriate damping effect of each sound clip within the audio clip. The acoustic editing program allows for a user to opt-in as an administrative user for the augmented or virtual reality environment to modify audio clips with appropriate damping of sound clips. The acoustic editing program can create a sound wave profile for each sound clip within the audio clip by analyzing a sound profile of the audio clip, identifying whether damping is necessary of any sound clips in the audio clip, and splitting the audio clip into individual sound clips to perform damping where needed. Since multiple sound clips can overlay one another, the acoustic editing program splits each sound clip so appropriate damping can be performed. The acoustic editing program can identify a source for each sound clip from the audio clip and identify where proper stitching is required subsequent to performing damping.

The acoustic editing program can be incorporated into an augmented or virtual reality electronic device (e.g., wearable headset with speakers), where the administrative user can modify each sound clip of the audio clip. The acoustic editing program can identify undamped or underdamped sound clips from the audio by comparing each sound clips to a historical corpus and can perform damping based on the historical corpus to damp each sound clip to mimic natural sound damping in a physical environment. The acoustic editing program can alter a damping coefficient of each sound clip and a damping type (e.g., complete damping, no damping, varying damping) of each sound clip to mimic the natural sound damping in the physical environment. The acoustic editing program can display a visual representation of sound waves for each sound clip of the audio clip in an augmented or virtual reality electronic device associated with the administrative user, along with a position of each sound clip relative to a location of the user where the user can alter a position of each sound clip via an input in the augmented or virtual reality electronic device. The acoustic editing program can provide a selection of modifications to each sound wave of a sound clip in a user collaborative environment, where multiple users can edit the audio clips as designated administrative users.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as acoustic editing program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
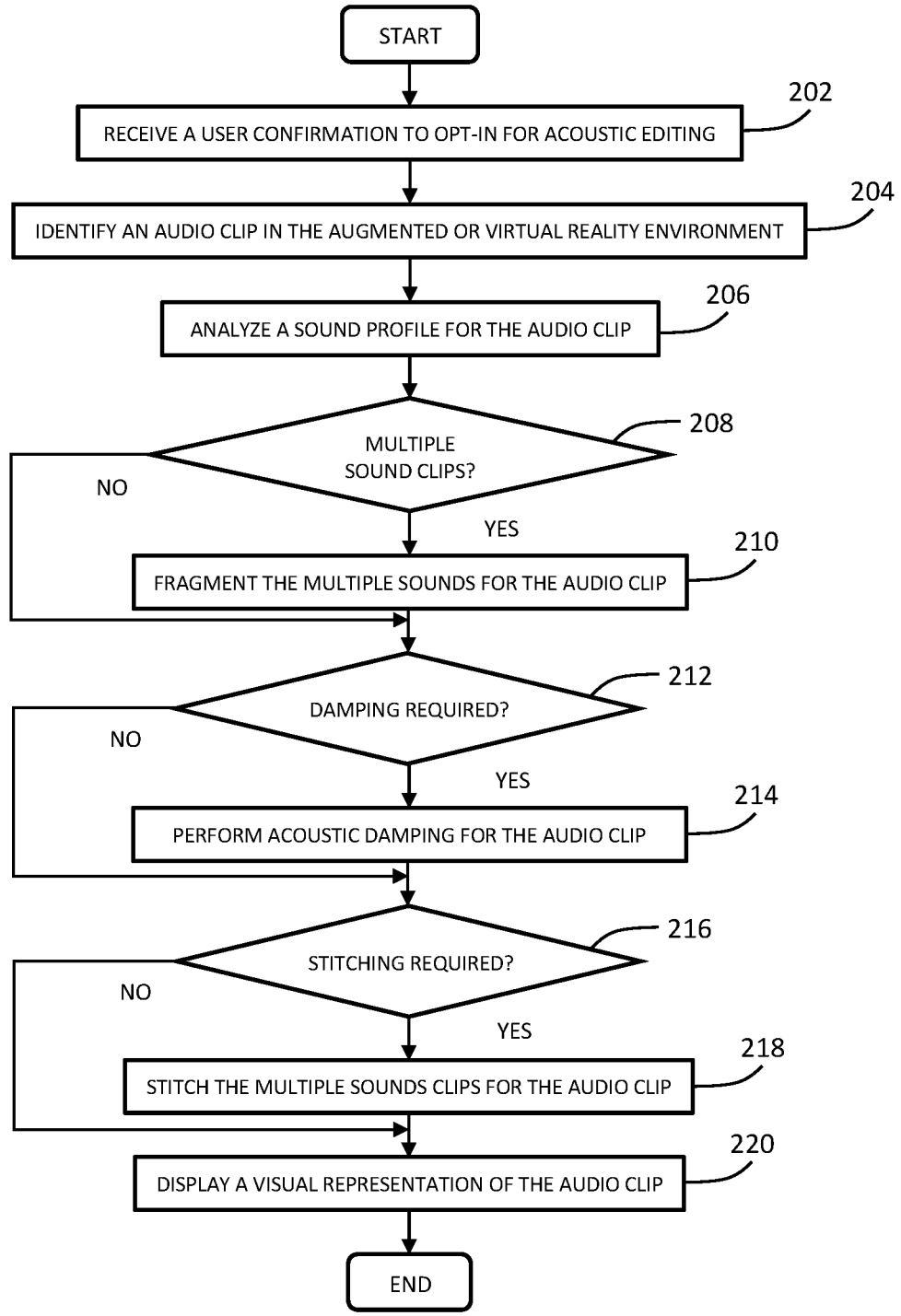
FIG. 2 depicts a flowchart of an acoustic editing program for stitching multiple sound clips to create an aggregated sound clip, in accordance with an embodiment of the present invention.

FIG. 2 depicts a flowchart of an acoustic editing program for stitching multiple sound clips to create an aggregated sound clip, in accordance with an embodiment of the present invention.

Acoustic editing program 200 receives user confirmation to opt-in for acoustic editing (202). In one embodiment, acoustic editing program 200 allows for a user to opt-in for acoustic editing of sound clips for a virtual reality (VR) environment utilizing a VR electronic device associated with the user, where the user utilizes the VR electronic device (e.g., headset) to access the VR environment. In another embodiment, acoustic editing program 200 allows for a user to opt-in for acoustic editing of sound clips for an augmented reality environment utilizing an AR electronic device associated with the user, where the user utilizes the AR electronic device (e.g., smart glasses) to access the AR environment. With the user opt-in in for acoustic editing, acoustic editing program 200 assigns an administrative role to the user for editing various sound clips in the VR or AR environment. Acoustic editing program 200 manages a historical corpus, discussed in further detail with regards to (312) in FIG. 3, of the edits for the various sound clips in the VR or AR environment.

Acoustic editing program 200 identifies an audio clip in an augmented or virtual reality environment (204). As the user enters a physical or virtual environment with the AR or VR device, acoustic editing program 200 determines a location for the user in the physical or virtual reality environment. In one embodiment, acoustic editing program 200 identifies an existing audio clip for the location in the physical or virtual reality environment, where acoustic editing program 200 can utilize an integrated audio editing software to extract track information. In another embodiment, acoustic editing program 200 can identify an audio clip in an augmented reality environment that includes a sound clip from the physical environment and an existing digital sound clip for the location in the physical environment. The portion of the audio clip that includes sound clip from the physical environment that acoustic editing program 200 identifies is storable in the historical corpus and subsequently usable for other user (i.e., non-admirative user) entering the location in the augmented reality environment. For example, if the audio clip includes a sound clip of tree leave rustling from the physical environment and an existing digital sound clip of wind blowing for the location, acoustic editing program 200 can update the historical corpus by storing the sound clip of the tree leaves rustling from the physical environment as the audio clip for the location that already includes the existing digital sound clip of the wind blowing.

Acoustic editing program 200 analyzes a sound profile for the audio clip (206). As previously mentioned, acoustic editing program 200 utilizes an integrated audio editing software to extract track information for the AR or VR environment and acoustic editing program 200 analyzes the sound profile for the audio clip based on the extracted track information to identify each sound clip in the audio clip. The audio clip includes one or more sound clips for the location in the AR or VR environment, where each sound clip is associated with an audio source from which the sound clip originated. Each sound clip generates a sound wave that includes damping which dictates a duration and intensity of the sound clip at the location in which the user is positioned within the AR or VR environment. Acoustic editing program 200 can analyze the sound wave for each sound clip of the audio clip through a Fourier Transformation utilizing formula (A) provided below:

$$f(t) = a_0 + \sum_{m=1}^{\infty} a_m \cos\left(\frac{2\pi mt}{T}\right) + \sum_{n=1}^{\infty} b_n \sin\left(\frac{2\pi mt}{T}\right) \quad (A)$$

Through the analyzation of the audio clip, acoustic editing program 200 identifies the one or more sound clips, an audio source for each of the one or more sound clips of the audio clip, and a location for the audio sources for each of the one or more sound clips of the audio clip.

Acoustic editing program 200 determines whether multiple sound clips are present in the audio clip (decision 208). In the event acoustic editing program 200 determines multiple sound clips are present in the audio clip ("yes" branch, decision 208), acoustic editing program 200 fragments the multiple sound clips for the audio clip (210). In the event acoustic editing program 200 determines multiple sound clips are not present in the audio clip ("no" branch, decision 208), acoustic editing program 200 determines whether damping of the single sound clip representing the audio clip is required (decision 212).

Acoustic editing program 200 fragments the multiple sound clips for the audio clip (210). Since the audio clip can include at least two overlapping sound clips, acoustic editing program 200 fragments the multiple sound clips for the audio clip by pulling each sound clip from the multiple sound clips that form the audio clip for the AR or VR environment. By fragmenting the multiple sound clips, acoustic editing program 200 can identify a damping profile for each sound clip that form the audio clip, where the damping profile is subsequently viewable in an AR or VR electronic device associated with the user. Fragmenting the multiple sounds clips allows for the user of acoustic editing program 200 to view the damping profile of each individual sound clip, since a damping profile of one sound clip can overpower or mask a damping profile of another sound clip, thus affecting user experience for the location in the AR or VR environment.

Acoustic editing program 200 determines whether damping of the sound clips representing the audio clip is required (decision 212). In the event acoustic editing program 200 determines demining of the sound clips presenting the audio clip is required ("yes" branch, decision 212), acoustic editing program 200 performs acoustic damping for the audio clip (214). In the event acoustic editing program 200 determines damping of the sound clips representing the audio is not required ("no" branch, decision 212), acoustic editing program 200 determines whether stitching of the audio clip is required (decision 216). Acoustic editing program 200 can utilizes a historical corpus for various sounds in an AR or VR environment that is continuously updatable by the user. Acoustic editing program 200 utilizes the historical corpus to identify which sound clip from the audio clip requires complete damping, varying damping, or no damping. Different sound clips of the audio clip can include different types of sounds, where complete damping is not captured and may not even be required. For example, acoustic editing program 200 previously identified a location for the audio clip as a cafe, where the audio clip can include a portion of sound clips that require completely damping and another portion of sounds clips that do not require complete damping. A sound clip of indistinct conversations of various customers at the cafe engaging in conversations represents continuous audio at the location, where acoustic editing program 200 can utilize the historical corpus to determine that complete damping of this sound clip is not required. Instead, acoustic editing program 200 determines that a varying degree of damping is required, since the indistinct conversations are coming from multiple sources (i.e., customers) at the location. A sound clip of a coffee cup being placed on a dish represents a sound clip that would require complete damping, since the impact of the coffee cup with the dish is not a continuous sound in the AR or VR environment. Acoustic editing program 200 determines that complete damping is required for the sound clip of the coffee cup being placed on the sound.

Acoustic editing program 200 performs acoustic damping for the audio clip (214). For each sound clip of the audio clip, acoustic editing program 200 utilizes the historical corpus to determine whether complete damping, varying damping, or no damping of a sound wave is required. For an instance of a sound clip where acoustic editing program 200 determines the historical corpus does not include an entry for an indicated level of damping (i.e., damping ratio), the sound clip remains unaltered. Acoustic editing program 200 allows for the user to alter that sound clip and subsequently update the historical corpus for subsequent damping of similar sound clip. The updating of the historical corpus is discussed in further detail with regards to (312) in FIG. 3. From the previously discussed example where the audio clip is for a cafe in the AR or VR environment, acoustic editing program 200 identified multiple sound clips for the audio clip that include indistinct conversations, a coffee cup impacting a dish, background music, and footsteps. Acoustic editing program 200 utilizes the historical corpus to perform varying damping on the indistinct conversations, a complete damping for the coffee cup impacting the dish, and complete damping for the footsteps. However, acoustic editing program 200 determines that the sound clip of the background music does not exist in the historical corpus and therefore, acoustic editing program 200 determines to not perform acoustic damping for the sound clip.

Acoustic editing program 200 determines whether stitching of the audio clip is required (decision 216). In the event acoustic editing program 200 determines stitching of the audio clip is required ("yes" branch, decision 216), acoustic editing program 200 stitches the multiple sounds clips for the audio clip (218). In the event acoustic editing program 200 determines stitching of the audio clip is not required ("no" branch, decision 216), acoustic editing program 200 displays a visual representation of the audio clip (220). If the audio clip was previously fragmented due to the multiple sound clips, acoustic editing program 200 determines stitching of the audio clip is required. Furthermore, if acoustic editing program 200 previously performed acoustic damping of at least one sound clip from the multiple sound clips of the audio, acoustic editing program 200 takes into consideration how the stitching of the multiple sound clips with the at least one sound clip with the acoustic damping occurs.

Acoustic editing program 200 stitches the multiple sounds clips for the audio clip (218). Acoustic editing program 200 stitches the multiple sound clips for the audio clip by analyzing various properties of each sound clip and the location of the user in the AR or VR environment. Properties of each sound clip can indicate whether the sound clip is random or correlated to another item (e.g., sound clip, action) within the AR or VR environment. From the previously discussed example where the audio clip is for a cafe in the AR or VR environment, acoustic editing program 200 stitches the multiple sound clips for the audio clip that include indistinct conversations, a coffee cup impacting a dish, background music, and footsteps. As previously discussed, acoustic editing program 200 performed varying damping on the indistinct conversations, a complete damping for the coffee cup impacting the dish, and complete damping for the footsteps. Acoustic editing program 200 stitches the multiple sound clips for the audio clip by overlaying the indistinct conversations over background music, while inserting random instances of a coffee cup impacting the dish and footsteps into the overlay with the indistinct conversation and background music. Acoustic editing program 200 determines, based on the properties of background music as it relates to indistinct conversation, that the distinct conversations should overlay the background music, since background music should not overpower (i.e., louder than) conversations of customers in the cafe.

Acoustic editing program 200 displays a visual representation of the audio clip (220). Acoustic editing program 200 can display, in an AR or VR electronic device associated with the user, various visual representations of the audio clip with the at least one sound clip. Through the utilization of the AR or VR electronic device, acoustic editing program 200 can receive various modifications to the audio clip, discussed in further detail with regards to (306) in FIG. 3. In one embodiment, acoustic editing program 200 displays a visual representation of the audio clip with the multiple sound clips stitched to form the audio clip, from (218). Acoustic editing program 200 can utilize a distinct color for each sound clip from the multiple sound clips of the audio clip for the location, along with distinct representations differentiating an original portion of a sound clip and a modified damping portion of the sound clip, discussed in further detail with regards to FIGS. 4A and 4B. Acoustic editing program 200 can include an option to view each sound clip individually with or without the damping performed in (214).

Figure 3:
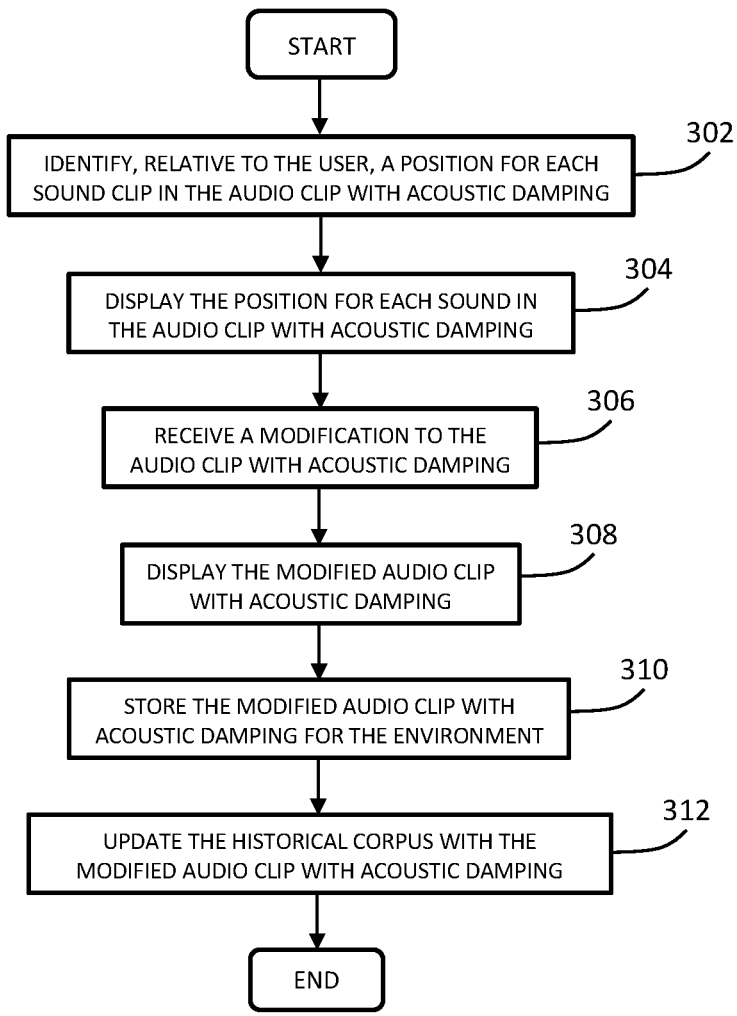
FIG. 3 depicts a flowchart of an acoustic editing program for modifying an aggregated sound clip and developing a historical corpus with multiple aggregated sound clips, in accordance with an embodiment of the present invention.

FIG. 3 depicts a flowchart of an acoustic editing program for modifying an aggregated sound clip and developing a historical corpus with multiple aggregated sound clips, in accordance with an embodiment of the present invention.

Acoustic editing program 200 identifies, relative to the user, a position for each sound clip in the audio clip with acoustic damping (302). As previously discussed, as the user enters a physical or virtual environment with the AR or VR device, acoustic editing program 200 determines a location for the user in the physical or virtual reality environment. In one embodiment, the audio clip with damping includes a sound clip from the physical environment and an existing digital sound clip for the location in the physical environment. The sound clip from the physical environment is capturable by a microphone on the AR electronic device associated with the user, where acoustic editing program 200 can determine a position of the sound clip from the physical environment relative to the known location of the user. For the existing digital sound clip from the location in the physical environment, acoustic editing program 200 can utilize the historical corpus to identify a position of the existing digital sound clip from the physical environment relative to the known location of user. In another embodiment, acoustic editing program 200 identifies, relative to the user, a position for each sound clip in the audio clip with acoustic damping in a VR environment. From the previously discussed example where the audio clip is for a cafe in a VR environment, acoustic editing program 200 identified multiple sound clips for the audio clip that include indistinct conversations, a coffee cup impacting a dish, background music, and footsteps. Acoustic editing program 200 identifies multiple positions for the distinct conversations, where the multiple locations are at 45°, 105°, and 285° relative to the user's forward-facing orientation of 0°. Acoustic editing program 200 identifies a position of the coffee impacting a dish as 285° relative to the user's forward-facing orientation of 0°. Acoustic editing program 200 identifies a position of the background music as surrounding the user (i.e., 360°) and a position of the footsteps as transitioning between 220° to 160° relative to the user's forward-facing orientation of 0°.

Acoustic editing program 200 displays the position for each sound in the audio clip with acoustic damping (304). Acoustic editing program 200 displays, in an AR or VR electronic device associated with the user, the position for each sound in the audio clip with acoustic damping. Acoustic editing program 200 displays a position (i.e., original location) for each sound clip of the audio clip relative to a position of the user and an example is discussed in further detail with regards to FIG. 4C. Based on a volume and a degree of damping of each sound clip, acoustic editing program 200 displays a position each sound clip at an appropriate distance from the position of the user. For example, acoustic editing program 200 displays a higher volume sound clip at a position with a shorter distance to the user compared to a lower volume sound clip at a position with a greater distance to the user.

Acoustic editing program 200 receives a modification to the audio clip with acoustic damping (306). In one embodiment, acoustic editing program 200 receives, via a VR electronic device associated with the user, a modification to the audio clip with acoustic damping, where the modification includes an alteration to a position of a sound clip from the audio clip. For example, acoustic editing program 200 previously identified and displayed a position of a sound clip for a coffee cup impacting a dish as 285° relative to the user's forward-facing orientation of 0°. Acoustic editing program 200 receives a modification to the position via the VR electronic device, where the user drags the position of the sound clip for the coffee cup impacting the dash to 20° relative to the user's forward-facing orientation of 0°. In another embodiment, acoustic editing program 200 receives, via an AR electronic device associated with the user, a modification to the audio clip with acoustic damping, where the modification includes an alteration to a damping of a sound clip from the audio clip. For example, acoustic editing program 200 previously performed acoustic damping for the sound clip from the audio clip utilizing a historical corpus for the specific noise (e.g., indistinct conversations in a cafe) in the sound clip. However, indistinct conversations in a cafe typically vary in volume as each person speaks from various positions within the cafe. Acoustic editing program 200 receives, via the VR electronic device, a modification that includes varying damping of the sound clip, where a volume increase and decrease in random intervals. In other embodiments, acoustic editing program 200 can receive modifications that include altering a damping ratio for a sound clip of the audio clip, a damping type (e.g., complete, varying, or no damping) for a sound clip of the audio clip, a position for a sound clip of the audio clip relative to a location of the user in an AR or VR environment, a removal of a sound clip from the audio clip, an addition of a sound clip to the audio clip, and an alteration to the stitching of multiple sound clips of the audio clip.

Acoustic editing program 200 displays the modified audio clip with acoustic damping (308). Similar to displaying a visual representation and a position of each sound clip from the audio clip, acoustic editing program 200 displays, in an AR or VR electronic device associated with the user, the modified audio clip with acoustic damping. The administrative user of acoustic editing program 200 can view the modification performed to the audio clip with acoustic damping and can replay the modified audio clip with acoustic damping at the location. Replaying can include acoustic editing program 200 continuously looping the modified audio clip with acoustic damping for the location, as long as the administrative user of Acoustic editing program 200 is present at the location.

Acoustic editing program 200 stores the modified audio clip with acoustic damping for the environment (310). Acoustic editing program 200 stores each sound clip of the modified audio clip with acoustic damping for each location in the AR or VR environment. By storing the modified audio clip with acoustic damping for each location in the AR or VR environment, a subsequent user entering experiences the modified audio clip with acoustic damping for the location in the AR or VR environment. The user entering the location in the AR or VR environment can be either an administrative user with admirative privileges who can alter the modified audio clip with acoustic damping later or a non-administrative user who is experiencing the modified audio clip with acoustic damping for the location in the AR or VR environment. Acoustic editing program 200 updates the historical corpus with the modified audio clip with acoustic damping (312). Acoustic editing program 200 updates the historical corpus with each sound clip from the modified audio clip with acoustic damping for the location. Acoustic editing program 200 utilizes the modifications received from the administrative user via an AR or VR electronic device for subsequent analyzing and damping of audio clips for other locations, thus reducing an amount of time the administrative user spends modifying an audio clip with damping.

Figure 4A:
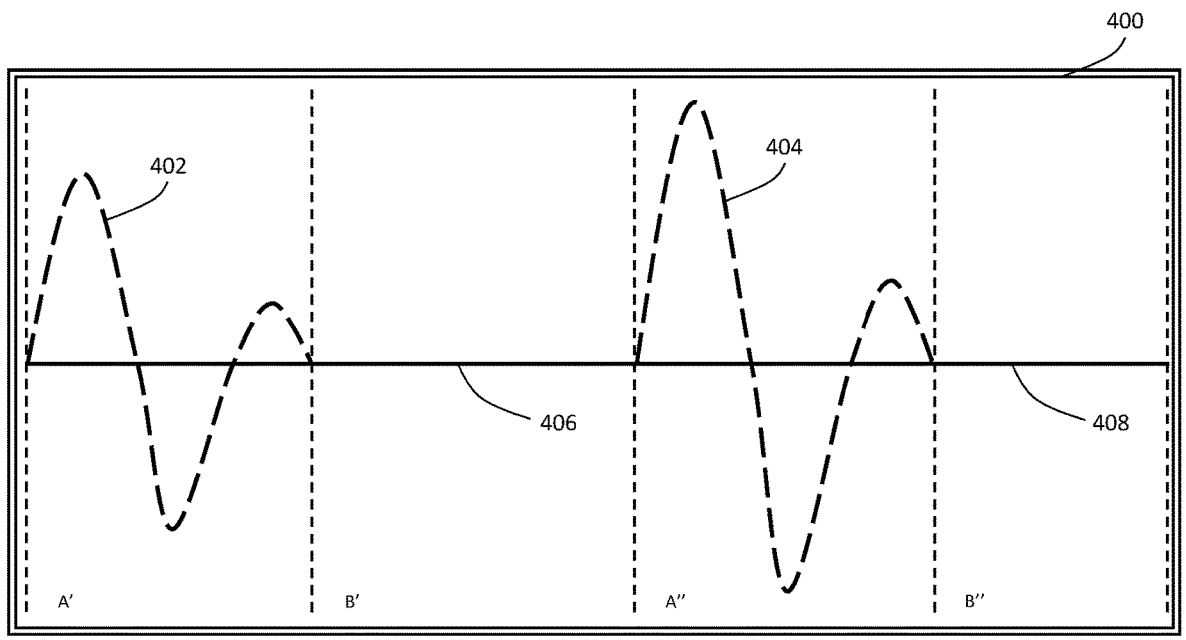
FIG. 4A depicts an illustrative example of multiple sound clips prior to stitching, in accordance with an embodiment of the present invention.

FIG. 4A depicts an illustrative example of multiple sound clips prior to stitching, in accordance with an embodiment of the present invention. In this example, acoustic editing program 200 identifies audio clip 400 in a VR environment for an administrative user with a VR electronic device at a specific location, determines audio clip 400 includes multiple sound clips, and fragments audio clip 400 into first sound clip 402 and second sound clip 404. Utilizing a historical corpus, acoustic editing program 200 determines damping is required for both first sound clip 402 and second sound clip 404 based on both sound clips matching entries in the historical corpus. First sound clip 402 represents a first person speaking indistinctly in a background and second sound clip 404 represent a second person speaking indistinctly in a background. Acoustic editing program 200 determines to perform acoustic damping to reduce the moments of silence represented by area 406 and 408 for audio clip 400, which can sound unnatural to other users due to sharp volume variations between first sound clip 402 and second sound clip 404.

Figure 4B:
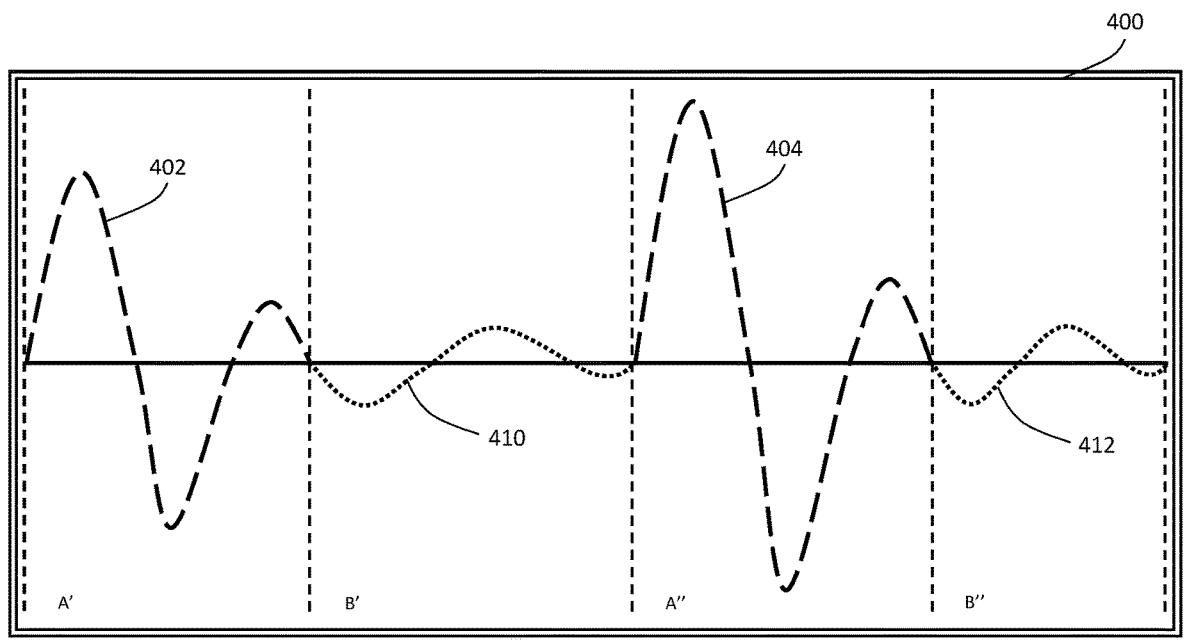
FIG. 4B depicts an illustrative example of multiple sound clips subsequent to stitching to create an aggregated sound clip, in accordance with an embodiment of the present invention.

FIG. 4B depicts an illustrative example of multiple sound clips subsequent to stitching to create an aggregated sound clip, in accordance with an embodiment of the present invention. Continuing the example from FIG. 4A, acoustic editing program 200 performs acoustic damping on first sound clip 402 and second sound clip 404 of audio clip 400. Based on the historical corpus, acoustic editing program 200 increases an oscillation for a decay of first sound clip 402 and second sound clip 404 by decreasing the damping ratio until a moment of silence is no longer present between first sound clip 402 and second sound clip 404. Acoustic editing program 200 adds first damping portion 410 to first sound clip 402 and adds second damping portion 412 to second sound clip 404. In this example, sound clip 400 is repeatedly played in a loop, therefore second damping portion 412 loops back to first sound clip 402 completing a cycle of a loop for audio clip 400 for the VR environment.

Figure 4C:
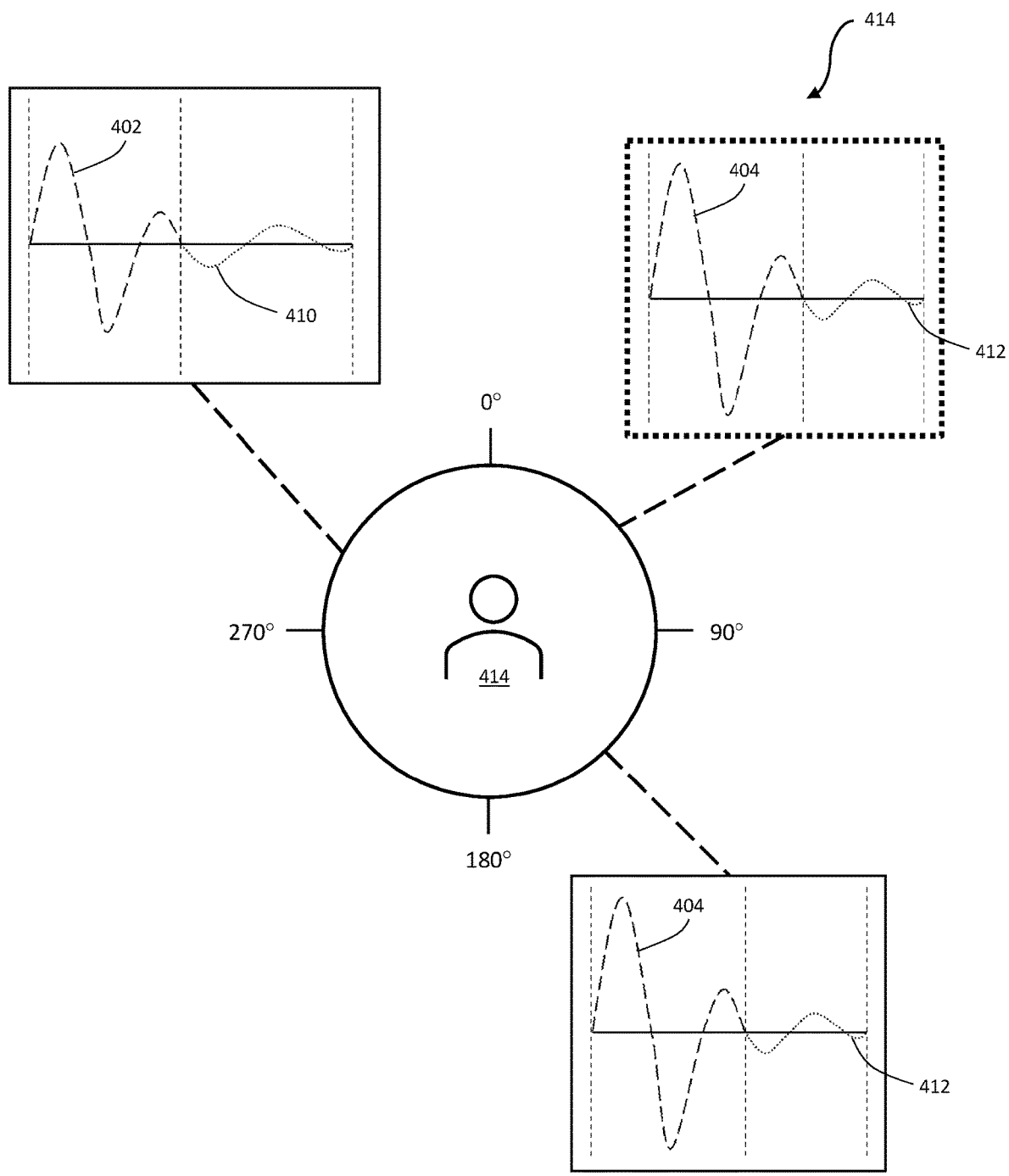
FIG. 4C depicts an illustrative example of modifying an aggregated sound clip based on a directional source for each sound clip, in accordance with an embodiment of the present invention.

FIG. 4C depicts an illustrative example of modifying an aggregated sound clip based on a directional source for each sound clip, in accordance with an embodiment of the present invention. Continuing the example from FIGS. 4B and 4C, acoustic editing program 200 displays visual 414 in a VR electronic device associated with the administrative user, where visual 414 provides a position of first sound clip 402 with first damping portion 410 and second sound clip 404 with second damping portion 412 relative to a location of the administrative user. In this example, acoustic editing program 200 identifies a position for first sound clip 402 with first damping portion 410 as 310° relative to the user's forward-facing orientation of 0° and a position for second sound clip 404 with second damping portion 412 as 135° relative to the user's forward-facing orientation of 0°. However, acoustic editing program 200 receives a modification to first sound clip 404 with second damping portion 412 by a user dragging, via the VR device, the visual representation from the 135° position to the 45° position, relative to the user's forward-facing orientation of 0°. Furthermore, acoustic editing program 200 can increase or decrease a volume of first sound clip 402 with first damping portion 410 and second sound clip 404 with second damping portion 412 by dragging each visual representation closer to or further from user visual 416, respectively.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying an audio clip for a location of a user in an augmented reality environment;
fragmenting the audio clip into a plurality of sound clips;
responsive to determining at least one sound clip from the audio clip requires acoustic damping, performing the acoustic damping on the at least one sound clip, wherein a damping ratio for the at least one sound clip is altered;
responsive to determining to stitch the plurality of sound clips, stitching the plurality of sounds clips to form the audio clip, wherein the plurality of sound clips includes the at least one sound clip with the acoustic damping; and
displaying a visual representation of the audio clip with the plurality of sound clips, wherein the visual representation of the audio clip with the plurality of sound clips is displayed in an augmented reality electronic device associated with the user.

2. The method of claim 1, further comprises:
determining, based on a historical corpus, the at least one sound clip from the audio clip requires the acoustic damping, wherein the acoustic damping includes complete damping of a sound wave for the at least one sound clip.

3. The method of claim 1, further comprises:
determining, based on a historical corpus, the at least one sound clip from the audio clip requires the acoustic damping, wherein the acoustic damping includes varying damping of a sound wave for the at least one sound clip.

4. The method of claim 1, further comprising:
responsive to identifying, relative to the location of the user, a position for each sound clip from the plurality of sound clips of the audio clip, displaying, in the augmented reality electronic device, the position for each sound clip from the plurality of sound clips of the audio clip;
receiving, via the augmented reality electronic device, a modification to the audio clip;
storing a modified audio clip for the location of the user in the augmented reality environment; and
updating a historical corpus with the modified audio clip for the location of the user in the augmented reality environment.

5. A computer program product comprising:
one or more computer-readable storage media and program instructions stored on the one or more computer-readable storage media capable of performing a method, the method comprising:

identifying an audio clip for a location of a user in an augmented reality environment;

fragmenting the audio clip into a plurality of sound clips;

responsive to determining at least one sound clip from the audio clip requires acoustic damping, performing the acoustic damping on the at least one sound clip, wherein a damping ratio for the at least one sound clip is altered;

responsive to determining to stitch the plurality of sound clips, stitching the plurality of sounds clips to form the audio clip, wherein the plurality of sound clips includes the at least one sound clip with the acoustic damping; and displaying a visual representation of the audio clip with the plurality of sound clips, wherein the visual representation of the audio clip with the plurality of sound clips is displayed in an augmented reality electronic device associated with the user.

6. The computer program product of claim 5, further comprises:

determining, based on a historical corpus, the at least one sound clip from the audio clip requires the acoustic damping, wherein the acoustic damping includes complete damping of a sound wave for the at least one sound clip.

7. The computer program product of claim 5, further comprises:

determining, based on a historical corpus, the at least one sound clip from the audio clip requires the acoustic damping, wherein the acoustic damping includes varying damping of a sound wave for the at least one sound clip.

8. The computer program product of claim 5, further comprising:

responsive to identifying, relative to the location of the user, a position for each sound clip from the plurality of sound clips of the audio clip, displaying, in the augmented reality electronic device, the position for each sound clip from the plurality of sound clips of the audio clip;

receiving, via the augmented reality electronic device, a modification to the audio clip;

storing a modified audio clip for the location of the user in the augmented reality environment; and updating a historical corpus with the modified audio clip for the location of the user in the augmented reality environment.

9. A computer system comprising:

one or more computer processors, one or more computer-readable storage media, and program instructions stored on the one or more of the computer-readable storage media for execution by at least one of the one or more processors capable of performing a method, the method comprising:

identifying an audio clip for a location of a user in an augmented reality environment;

fragmenting the audio clip into a plurality of sound clips;

responsive to determining at least one sound clip from the audio clip requires acoustic damping, performing the acoustic damping on the at least one sound clip, wherein a damping ratio for the at least one sound clip is altered;

responsive to determining to stitch the plurality of sound clips, stitching the plurality of sounds clips to form the audio clip, wherein the plurality of sound clips includes the at least one sound clip with the acoustic damping; and displaying a visual representation of the audio clip with the plurality of sound clips, wherein the visual representation of the audio clip with the plurality of sound clips is displayed in an augmented reality electronic device associated with the user.

10. The computer system of claim 9, further comprises:

determining, based on a historical corpus, the at least one sound clip from the audio clip requires the acoustic damping, wherein the acoustic damping includes complete damping of a sound wave for the at least one sound clip.

11. The computer system of claim 9, further comprises:

determining, based on a historical corpus, the at least one sound clip from the audio clip requires the acoustic damping, wherein the acoustic damping includes varying damping of a sound wave for the at least one sound clip.

12. The computer system of claim 9, further comprising:

responsive to identifying, relative to the location of the user, a position for each sound clip from the plurality of sound clips of the audio clip, displaying, in the augmented reality electronic device, the position for each sound clip from the plurality of sound clips of the audio clip;

receiving, via the augmented reality electronic device, a modification to the audio clip;

storing a modified audio clip for the location of the user in the augmented reality environment; and updating a historical corpus with the modified audio clip for the location of the user in the augmented reality environment.

* * * * *